United States Patent
Ge et al.

(10) Patent No.: US 11,194,641 B2
(45) Date of Patent: Dec. 7, 2021

(54) API TOPOLOGY HIDING METHOD, DEVICE, AND SYSTEM

(71) Applicant: HUAWEI TECHNOLOGIES CO., LTD., Guangdong (CN)

(72) Inventors: Cuili Ge, Beijing (CN); Niranth Amogh, Bangalore (IN); Yanmei Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/034,260

(22) Filed: Sep. 28, 2020

(65) Prior Publication Data
US 2021/0011790 A1 Jan. 14, 2021

Related U.S. Application Data

(63) Continuation of application No. PCT/CN2019/081809, filed on Apr. 8, 2019.

(30) Foreign Application Priority Data

Apr. 8, 2018 (CN) .......................... 201810308313.1

(51) Int. Cl.
*G06F 9/54* (2006.01)
*H04L 29/06* (2006.01)

(52) U.S. Cl.
CPC .............. *G06F 9/547* (2013.01); *H04L 67/40* (2013.01)

(58) Field of Classification Search
CPC ........... G06F 9/541; G06F 9/547; H04L 67/40
See application file for complete search history.

(56) References Cited

U.S. PATENT DOCUMENTS 10,942,794 B2 * 3/2021 Pattan ................. H04L 41/0866
2018/0234908 A1 * 8/2018 Di Girolamo .......... H04W 4/70
(Continued)

FOREIGN PATENT DOCUMENTS

| CN | 1889560 A | 1/2007 |
|---|---|---|
| CN | 101557603 A | 10/2009 |

(Continued)

OTHER PUBLICATIONS

Fagerberg, "Optimising clients with API gateways" (Jun. 8, 2015), Lund University, pp. 1-65 [retrieved from https://lup.lub.lu.se/luur/download?func=downloadFile&recordOId=5469608&fileOId=5469609].*

(Continued)

*Primary Examiner* — Brian W Wathen
(74) *Attorney, Agent, or Firm* — Fish & Richardson P.C.

(57) ABSTRACT

Embodiments of this application relate to the field of communications technologies, and disclose an application programming interface (API) topology hiding method, a device, and a system, to hide, from an API invoker, an API exposing function (AEF) that provides an API. The method includes: receiving, by a common API framework core function (CCF) from a topology hiding request entity, a request message that includes information about an API and that is used to request to hide an AEF that provides the API; determining, based on the request message, a topology hiding entry point used by an API invoker to invoke the API; and sending, to the topology hiding entry point, an identifier of the API and an identifier of the AEF that provides the API, so that the topology hiding entry point hides the AEF that provides the API.

19 Claims, 7 Drawing Sheets

(56) References Cited

U.S. PATENT DOCUMENTS

| 2018/0278705 A1* | 9/2018 | Wagenknecht | H04L 67/141 |
| 2018/0309693 A1* | 10/2018 | Kimura | H04L 47/70 |
| 2019/0149576 A1* | 5/2019 | Rajadurai | G06F 9/54 |
| | | | 713/151 |

FOREIGN PATENT DOCUMENTS

| CN | 104049806 A | 9/2014 |
| CN | 105338511 A | 2/2016 |
| CN | 105653905 A | 6/2016 |
| EP | 3264727 A1 | 1/2018 |
| WO | 2018001749 A1 | 1/2018 |
| WO | 2019194242 A1 | 10/2019 |

OTHER PUBLICATIONS

3GPP TR 23.722 v2.0.0 (Dec. 2017), "3rd Generation Partnership Project;Technical Specification Group Services and System Aspects;Study on Common API Framework for 3GPP Northbound APIs (Release 15)", Dec. 2017, 65 pages.

Nokia, "Pseudo-CR on adapting topology hiding solution to latest CAPIF architecture," 3GPP TSG-SA WG6 adhoc on CAPIF and FRMCS,S6a170197, Sophia Antipolis, France, Sep. 4-7, 2017, 2 pages.

Extended European Search Report in European Application No. 19786214.7, dated Mar. 12, 2021, 13 pages.

3GPP TS 33.122 V0.1.0 (Jan. 2018), "3rd Generation Partnership Project; Technical Specification Group Services and System Aspects; Security Aspects of Common API Framework for 3GPP Northbound APIs(Release 15)," Jan. 2018, 14 pages.

3GPP TS 23.222 V15.1.0 (Apr. 2018), "3rd Generation Partnership Project;Technical Specification Group Services and System Aspects;Functional architecture and information flows to support Common API Framework for 3GPP Northbound APIs;Stage 2(Release 15)," Apr. 2018, 87 pages.

Huawei et al., "Key Issue on hiding the real location of the service," 3GPP TSG-SA WG6 Meeting #16, S6-170454, Dali, P.R. China, Apr. 3-7, 2017, 2 pages.

Huawei et al., "Solution for service API policy control," 3GPP TSG-SA WG6 Meeting #17, S6-170788, Prague, Czech Republic, May 8-12, 2017, 5 pages.

Office Action issued in Chinese Application No. 201810308313.1 dated Nov. 10, 2020, 12 pages.

PCT International Search Report and Written Opinion issued in International Application No. PCT/CN2019/081809 dated Jul. 5, 2019, 16 pages (with English translation).

* cited by examiner

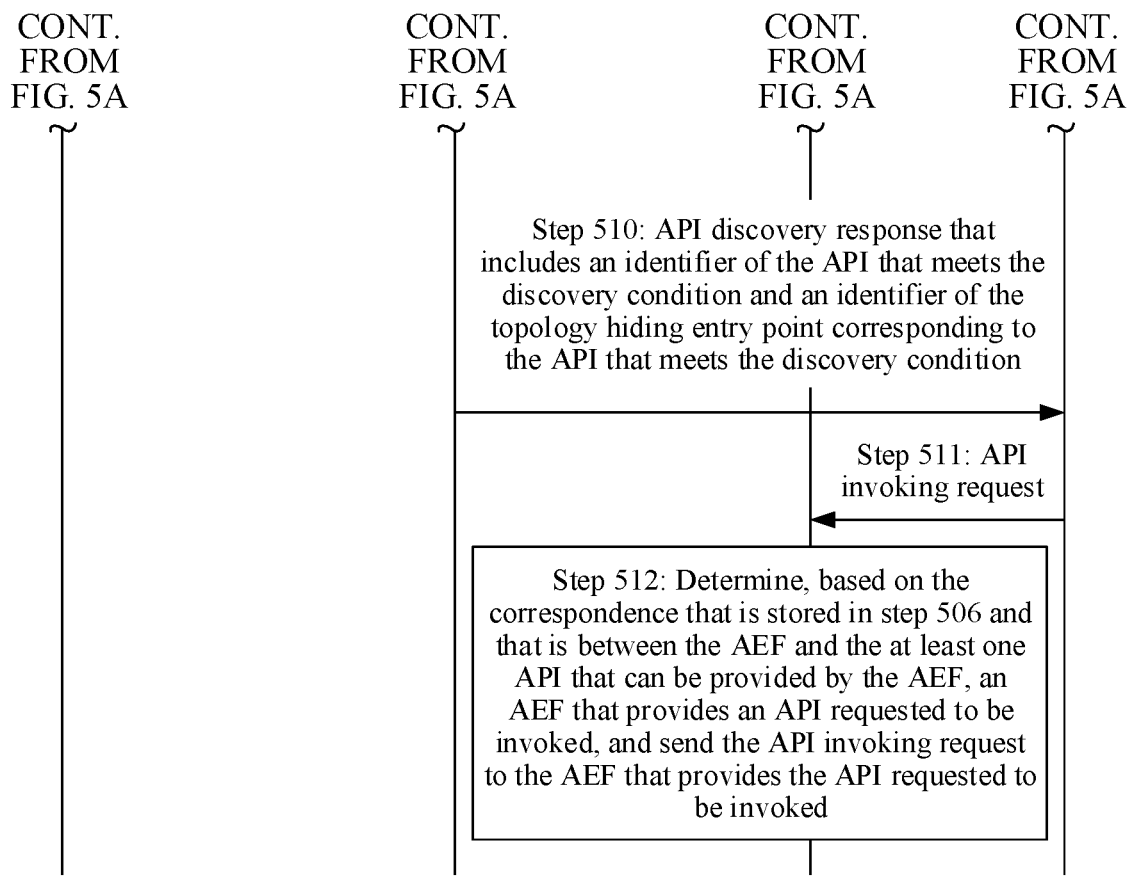

API TOPOLOGY HIDING METHOD, DEVICE, AND SYSTEM

CROSS-REFERENCE TO RELATED APPLICATION

This application is a continuation of International Application No. PCT/CN2019/081809, filed on Apr. 8, 2019, which claims priority to Chinese Patent Application No. 201810308313.1, filed on Apr. 8, 2018. The disclosures of the aforementioned applications are hereby incorporated by reference in their entireties.

TECHNICAL FIELD

Embodiments of this application relate to the field of communications technologies, and in particular, to an application programming interface (API) topology hiding method, a device, and a system.

BACKGROUND

The 3rd generation partnership project (3GPP) defines a common application programming interface framework (CAPIF). The CAPIF may include an API invoking entity, a common API framework core function (CCF), an API exposing function (AEF), an API management function entity, and the like. The AEF may provide one or more APIs. To implement load balance and access control, in the CAPIF, the AEF may be deployed in a cascading manner, may be deployed in a star manner, or may be deployed in another manner.

Currently, in the CAPIF, the API invoking entity usually obtains, from the CCF, information about the AEF that provides an API, and directly accesses the AEF that provides the API. In this process, if the information about the AEF that provides the API is used by a criminal, the AEF that provides the API may be maliciously attacked by the criminal. And a large quantity of illegal requests are sent to the AEF that provides the API. Consequently, software and hardware resources of the AEF are exhausted, a normal API invoking service cannot be provided, and so on. In this case, system security of the CAPIF is greatly reduced.

SUMMARY

Embodiments of this application provide an API topology hiding method, a device, and a system, to hide, from an API invoking entity, an AEF that provides an API, so as to improve system security of a CAPIF.

To achieve the foregoing objectives, the following technical solutions are used in the embodiments of this application.

According to a first aspect, an embodiment of this application provides an API topology hiding method. A CCF receives a request message including information about an API from a topology hiding request entity, and the request message is used to request to hide an AEF that provides the API. The CCF determines, based on the request message, a topology hiding entry point used by an API invoking entity to invoke the API. According to the method provided in this embodiment of this application, when the API invoking entity requests the CCF for discovering an API that meets a discovery condition, the CCF may send, to the API invoking entity based on a determined topology hiding entry point used by the API invoking entity to invoke the API, information about the topology hiding entry point of the API that meets the discovery condition, so that the API invoking entity sends an API invoking request to the topology hiding entry point based on the information about the topology hiding entry point to request to invoke the API, and does not need to directly send an API invoking request to an AEF that provides the API to request to invoke the API. Therefore, topology hiding of the API is implemented, and system security of a CAPIF is improved.

With reference to the first aspect, in a first possible design of the first aspect, the information about the API includes an identifier of the API, or an identifier of the API and an identifier of the AEF that provides the API. In this way, the CCF can learn, based on the identifier of the API, of the API that needs to be hidden, or learn, based on the identifier of the API and the identifier of the AEF that provides the API, of the API that needs to be hidden and the AEF that provides the API.

With reference to any one of the first aspect or the possible designs of the first aspect, in a second possible design of the first aspect, after the CCF determines the information about the topology hiding entry point, the CCF sends, to the topology hiding entry point, the identifier of the API and the identifier of the AEF that provides the API. For example, the CCF may add, to a notification message, the identifier of the API and the identifier of the AEF that provides the API, and send the notification message to the topology hiding entry point, to notify the topology hiding entry point to hide the AEF that provides the API. In this way, the topology hiding entry point can store, based on the received identifier of the API and the received identifier of the AEF that provides the API, a correspondence between the API and the AEF that provides the API. After receiving an API invoking request that is sent by the API invoking entity and that carries an identifier of an API requested to be invoked, the topology hiding entry point sends, based on the correspondence, the API invoking request to an AEF corresponding to the API requested to be invoked, to invoke the API.

According to a second aspect, an embodiment of this application provides an API topology hiding method. A CCF receives, from a topology hiding request entity, a request message including information about an AEF that provides at least one API, and the request message is used to request to hide the AEF. The CCF determines, based on the request message, a topology hiding entry point used by an API invoking entity to invoke the at least one API. According to the method provided in this embodiment of this application, one or more APIs can be hidden. When the API invoking entity requests the CCF for discovering an API that meets a discovery condition, the CCF may send, to the API invoking entity based on a determined topology hiding entry point used by the API invoking entity to invoke the API, information about the topology hiding entry point of the API that meets the discovery condition, so that the API invoking entity sends an API invoking request to the topology hiding entry point based on the information about the topology hiding entry point to request to invoke the API, and does not need to directly send an API invoking request to an AEF that provides the one or more APIs to request to invoke the API. Therefore, topology hiding of a plurality of APIs is implemented, and system security of a CAPIF is improved.

With reference to any one of the first aspect, the second aspect, or the possible designs of the first aspect, in a possible design, the request message is an API publish request, and the API publish request may be used to request the CCF to externally publish the API.

With reference to any one of the first aspect, the second aspect, or the possible designs of the first aspect, in a first possible design, the request message received by the CCF further includes information about a topology hiding entry point, and the CCF determines the topology hiding entry point of the API based on the information about the topology hiding entry point. To be specific, the topology hiding request entity specifies the topology hiding entry point of the API, and notifies the CCF of the information about the topology hiding entry point. Therefore, difficulty of determining the topology hiding entry point by the CCF is reduced.

With reference to any one of the first aspect, the second aspect, or the possible designs of the first aspect, in a second possible design, after receiving the request message, the CCF determines, based on the request message, that the topology hiding entry point is an AEF other than the AEF that provides the API, for example, uses any one of a plurality of AEFs (other than the AEF that provides the API) as the topology hiding entry point, selects an AEF with lowest load from a plurality of AEFs as the topology hiding entry point, or selects, from a plurality of AEFs as the topology hiding entry point, an AEF closest to the AEF that provides the API. In this way, the CCF may specify the topology hiding entry point, and the CCF has absolute master control right in determining the topology hiding entry point.

With reference to the second possible design, in a third possible design, after the CCF determines the topology hiding entry point of the API, the CCF sends the information about the topology hiding entry point to the topology hiding request entity, so that the topology hiding request entity stores the information about the topology hiding entry point, and adds the information about the topology hiding entry point to a new request message when initiating the new request message to the CCF.

With reference to any one of the first aspect, the second aspect, the possible designs of the first aspect, or the possible designs of the second aspect, in a fourth possible design, after determining the topology hiding entry point of the API, the CCF sends a response message to the topology hiding request entity, and the response message is used to indicate that topology hiding of the API is successfully set. In this way, the topology hiding request entity can learn that the topology hiding of the API has been successfully set.

With reference to any one of the first aspect, the second aspect, the possible designs of the first aspect, or the possible designs of the second aspect, in a fifth possible design, the method further includes: receiving, by the CCF from the API invoking entity, an API discovery request that carries a discovery condition; obtaining, based on the API discovery request, an API that meets the discovery condition; obtaining, based on a correspondence between an API and a topology hiding entry point, a topology hiding entry point corresponding to the API that meets the discovery condition; and sending, by the CCF to the API invoking entity, a discovery response that includes an identifier of the API that meets the discovery condition and an identifier of the topology hiding entry point corresponding to the API that meets the discovery condition. The correspondence between an API and a topology hiding entry point may be stored by the CCF on the CCF based on information about the API and information about the topology hiding entry point of the API. In this way, when the API invoking entity discovers the API, the CCF may provide the information about the topology hiding entry point of the API for the API invoking entity, so that the API invoking entity sends an API invoking request to the topology hiding entry point, instead of directly sending an invoking request to an AEF that provides the API. Therefore, topology hiding of the API is implemented.

With reference to any one of the first aspect, the second aspect, the possible designs of the first aspect, or the possible designs of the second aspect, in a sixth possible design, the topology hiding request entity is an API publish function APF or an API management function entity. In this way, different function entities may initiate request messages used to instruct the CCF to perform topology hiding on an API, so that API topology hiding flexibility is improved.

According to a third aspect, an embodiment of this application provides an API topology hiding method. A topology hiding request entity sends a request message that includes information about an API to a CCF to request to hide an AEF that provides the API, and receives a response message of the request message from the CCF. According to the method provided in this embodiment of this application, when needing to hide a topology structure of an API, the topology hiding request entity may send a request message to the CCF, so that the CCF determines a topology hiding entry point of the API. Therefore, topology hiding of the API is implemented.

With reference to the third aspect, in a first possible design of the third aspect, the information about the API includes an identifier of the API, or an identifier of the API and an identifier of the AEF that provides the API. In this way, the CCF can learn, based on the identifier of the API, of the API that needs to be hidden, or learn, based on the identifier of the API and the identifier of the AEF that provides the API, of the API that needs to be hidden and the AEF that provides the API.

According to a fourth aspect, an embodiment of this application provides an API topology hiding method. A topology hiding request entity sends, to a CCF, a request message that includes information about an AEF that provides at least one API, to request to hide the AEF, and receives a response message of the request message from the CCF. According to the method provided in this embodiment of this application, when needing to hide some APIs, the topology hiding request entity may send a request message including information about an AEF to the CCF, so that the CCF determines to perform topology hiding on the AEF or all APIs on the AEF.

With reference to the third aspect or the fourth aspect, in a possible design, the request message is an API publish request, and the API publish request may be used to request the CCF to externally publish the API.

With reference to any one of the third aspect, the fourth aspect, or the possible designs of the third aspect, in a possible design, the response message is used to indicate that topology hiding of the API is successfully set. In this way, the topology hiding request entity can learn that the topology hiding of the API has been successfully set.

With reference to any one of the third aspect, the fourth aspect, the possible designs of the third aspect, or the possible designs of the fourth aspect, in another possible design, the request message further includes information about a topology hiding entry point of the API. In this way, the topology hiding request entity specifies the topology hiding entry point of the API, and notifies the CCF of the information about the topology hiding entry point. Therefore, difficulty of determining the topology hiding entry point by the CCF is reduced.

With reference to any one of the third aspect, the fourth aspect, the possible designs of the third aspect, or the possible designs of the fourth aspect, in another possible design, the method further includes: receiving, by the topology hiding request entity, information about a topology hiding entry point of the API from the CCF. In this way, the CCF can specify the topology hiding entry point, and send the information about the topology hiding entry point to the topology hiding request entity, so that the topology hiding request entity stores the information about the topology hiding entry point, and adds the information about the topology hiding entry point to a new request message when initiating the new request message to the CCF.

With reference to any one of the third aspect, the fourth aspect, the possible designs of the third aspect, or the possible designs of the fourth aspect, in another possible design, the method further includes: sending, by the topology hiding request entity to the topology hiding entry point of the API, the identifier of the API and the identifier of the AEF that provides the API. For example, the topology hiding request entity may add the identifier of the API and the identifier of the AEF that provides the API to a notification message and send the notification message to the topology hiding entry point, to notify the topology hiding entry point to hide the AEF that provides the API. In this way, the topology hiding entry point can store, based on the received identifier of the API and the received identifier of the AEF that provides the API, a correspondence between the API and the AEF that provides the API. After receiving an API invoking request that is sent by the API invoking entity and that carries an identifier of an API requested to be invoked, the topology hiding entry point sends, based on the correspondence, the API invoking request to an AEF corresponding to the API requested to be invoked, to invoke the API.

It should be noted that, in this possible design, if the request message includes information about an AEF that provides at least one API, the topology hiding request entity sends, to the topology hiding entry point of the API, an identifier of the at least one API and an identifier of the AEF that provides the at least one API.

With reference to any one of the third aspect, the fourth aspect, the possible designs of the third aspect, or the possible designs of the fourth aspect, in another possible design, the topology hiding request entity is an API publish function APF or an API management function entity. In this way, different function entities may initiate request messages to the CCF, so that API topology hiding flexibility is improved.

According to a fifth aspect, an embodiment of this application provides an API topology hiding method. A topology hiding entry point receives, from an API invoking entity, an API invoking request that carries an identifier of an API requested to be invoked, and sends the API invoking request to an AEF that provides the API requested to be invoked. According to the method provided in this embodiment of this application, the API invoking entity can invoke an API on an AEF by using a topology hiding entry point of the API, and does not need to directly send an API invoking request to the AEF that provides the API, so that information about the AEF that provides the API is hidden, and system security of a CAPIF is improved.

With reference to the fifth aspect, in a first possible design of the fifth aspect, that the topology hiding entry point sends the API invoking request to an AEF that provides the API requested to be invoked includes: sending, by the topology hiding entry point based on a correspondence between an API and an AEF that provides the API, the API invoking request to the AEF that provides the API requested to be invoked. In this way, the AEF that provides the API can be found based on the correspondence between an API and an AEF that provides the API, and the API invoking request sent by the API invoking entity is sent to the AEF.

With reference to the first possible design of the fifth aspect, in a second possible design of the fifth aspect, the topology hiding entry point receives the identifier of the API and an identifier of the AEF that provides the API, and stores, based on the identifier of the API and the identifier of the AEF that provides the API, a correspondence between the API and the AEF that provides the API. Alternatively, the topology hiding entry point receives the correspondence. In other words, the topology hiding entry point may obtain, in different manners, the correspondence between the API and the AEF that provides the API, so that flexibility of obtaining the correspondence is improved.

With reference to the second possible design of the fifth aspect, in a third possible design of the fifth aspect, that the topology hiding entry point receives the identifier of the API and an identifier of the AEF that provides the API includes: receiving, by the topology hiding entry point from a common API framework core function CCF, the identifier of the API and the identifier of the AEF that provides the API, or receiving, by the topology hiding entry point from an API publish function APF or an API management function entity, the identifier of the API and the identifier of the AEF that provides the API. The identifier of the API and the identifier of the AEF that provides the API may be carried in a notification message used to instruct the topology hiding entry point to hide the AEF that provides the API. In this way, the topology hiding entry point can obtain, from the CCF, the APF, or the API management function entity, the identifier of the API and the identifier of the AEF that provides the API.

It should be noted that, in any one of the fifth aspect or the possible designs of the fifth aspect, the topology hiding entry point may alternatively receive an identifier of at least one API and an identifier of an AEF that provides the at least one API, so as to implement batch hiding of a plurality of APIs.

According to a sixth aspect, an embodiment of this application provides a CCF. The CCF may implement a function performed by the CCF in the foregoing aspects or possible designs. The function may be implemented by hardware, or may be implemented by hardware by executing corresponding software. The hardware or the software includes one or more modules corresponding to the foregoing function. For example, the CCF may include a receiving unit and a determining unit.

In a possible design, the receiving unit is configured to receive a request message including information about an API from a topology hiding request entity, and the determining unit is configured to determine a topology hiding entry point of the API based on the request message received by the receiving unit.

In another possible design, the request message that includes the information about the API and that is received by the receiving unit may be replaced with a request message that includes information about an AEF. A sending unit is further configured to send, to the topology hiding entry point, an identifier of at least one API that can be provided by the AEF and an identifier of the AEF.

For a specific implementation of the CCF, refer to a behavior function of the CCF in the API topology hiding method provided in any one of the first aspect, the second aspect, or the possible designs of the foregoing aspects. Details are not described herein again. Therefore, the provided CCF can achieve same beneficial effects as any one of the first aspect, the second aspect, or the possible designs of the foregoing aspects.

According to a seventh aspect, a CCF is provided, and includes a processor and a memory. The memory is configured to store a computer executable instruction. When the CCF runs, the processor executes the computer executable instruction stored in the memory, so that the CCF performs the API topology hiding method according to any one of the first aspect, the second aspect, or the possible designs of the foregoing aspects.

According to an eighth aspect, a computer-readable storage medium is provided. The computer-readable storage medium stores an instruction. When the instruction is run on a computer, the computer is enabled to perform the API topology hiding method according to any one of the first aspect, the second aspect, or the possible designs of the foregoing aspects.

According to a ninth aspect, a computer program product including an instruction is provided. When the computer program product is run on a computer, the computer is enabled to perform the API topology hiding method according to any one of the first aspect, the second aspect, or the possible designs of the foregoing aspects.

According to a tenth aspect, a chip system is provided. The chip system includes a processor and a communications interface, and is configured to support a CCF in implementing functions in the foregoing aspects, for example, support the processor in receiving a request message including information about an API from a topology hiding request entity by using the communications interface, and determining a topology hiding entry point of the API based on the request message. In a possible design, the chip system further includes a memory. The memory is configured to store a program instruction and data that are necessary for the CCF. The chip system may include a chip, or may include a chip and another discrete device.

For a technical effect brought by any design manner in the sixth aspect to the tenth aspect, refer to the technical effect brought by any one of the first aspect, the second aspect, or the possible designs of the foregoing aspects. Details are not described again.

According to an eleventh aspect, an embodiment of this application provides a topology hiding request entity. The topology hiding request entity may implement a function performed by the topology hiding request entity in the foregoing aspects or possible designs. The function may be implemented by hardware, or may be implemented by hardware by executing corresponding software. The hardware or the software includes one or more modules corresponding to the foregoing function. For example, the topology hiding request entity may include a sending unit and a receiving unit.

The sending unit is configured to send a request message that includes information about an API to a CCF. The receiving unit is configured to receive a response message of the request message from the CCF.

For a specific implementation of the topology hiding request entity, refer to a behavior function of the topology hiding request entity in the API topology hiding method provided in any one of the third aspect, the fourth aspect, or the possible designs of the foregoing aspects. Details are not described herein again. Therefore, the provided topology hiding request entity can achieve same beneficial effects as any one of the third aspect, the fourth aspect, or the possible designs of the foregoing aspects.

According to a twelfth aspect, a topology hiding request entity is provided, and includes a processor and a memory. The memory is configured to store a computer executable instruction. When the topology hiding request entity runs, the processor executes the computer executable instruction stored in the memory, so that the topology hiding request entity performs the API topology hiding method according to any one of the third aspect, the fourth aspect, or the possible designs of the foregoing aspects.

According to a thirteenth aspect, a computer-readable storage medium is provided. The computer-readable storage medium stores an instruction. When the instruction is run on a computer, the computer is enabled to perform the API topology hiding method according to any one of the third aspect, the fourth aspect, or the possible designs of the foregoing aspects.

According to a fourteenth aspect, a computer program product including an instruction is provided. When the computer program product is run on a computer, the computer is enabled to perform the API topology hiding method according to any one of the third aspect, the fourth aspect, or the possible designs of the foregoing aspects.

According to a fifteenth aspect, a chip system is provided. The chip system includes a processor and a communications interface, and is configured to support a topology hiding request entity in implementing functions in the foregoing aspects, for example, support the processor in receiving information about a topology hiding entry point of an API from a CCF by using the communications interface, and sending, to the topology hiding entry point of the API, an identifier of the API and an identifier of an AEF that provides the API. In a possible design, the chip system further includes a memory. The memory is configured to store a program instruction and data that are necessary for the topology hiding request entity. The chip system may include a chip, or may include a chip and another discrete device.

For a technical effect brought by any design manner in the eleventh aspect to the fifteenth aspect, refer to the technical effect brought by any one of the third aspect, the fourth aspect, or the possible designs of the foregoing aspects. Details are not described again.

According to a sixteenth aspect, an embodiment of this application provides a topology hiding entry point. The topology hiding entry point may implement a function performed by the topology hiding entry point in the foregoing aspects or possible designs. The function may be implemented by hardware, or may be implemented by hardware by executing corresponding software. The hardware or the software includes one or more modules corresponding to the foregoing function. For example, the topology hiding entry point may include a receiving unit and a sending unit.

The receiving unit is configured to receive, from an API invoking entity, an API invoking request that carries an identifier of an API requested to be invoked. The sending unit is configured to send the API invoking request to an AEF that provides the API requested to be invoked.

For a specific implementation of the topology hiding entry point, refer to a behavior function of the topology hiding entry point in the API topology hiding method provided in any one of the fifth aspect or the possible designs of the foregoing aspect. Details are not described herein again. Therefore, the provided topology hiding entry point can achieve same beneficial effects as any one of the first aspect, the second aspect, or the possible designs of the foregoing aspects.

According to a seventeenth aspect, a topology hiding entry point is provided, and includes a processor and a memory. The memory is configured to store a computer executable instruction. When the topology hiding entry point runs, the processor executes the computer executable instruction stored in the memory, so that the topology hiding entry point performs the API topology hiding method according to any one of the fifth aspect or the possible designs of the foregoing aspect.

According to an eighteenth aspect, a computer-readable storage medium is provided. The computer-readable storage medium stores an instruction. When the instruction is run on a computer, the computer is enabled to perform the API topology hiding method according to any one of the fifth aspect or the possible designs of the foregoing aspect.

According to a nineteenth aspect, a computer program product including an instruction is provided. When the computer program product is run on a computer, the computer is enabled to perform the API topology hiding method according to any one of the fifth aspect or the possible designs of the foregoing aspect.

According to a twentieth aspect, a chip system is provided. The chip system includes a processor and a communications interface, and is configured to support a topology hiding entry point in implementing functions in the foregoing aspects, for example, support the processor in receiving a request message including information about an API from a topology hiding request entity by using the communications interface, and determining a topology hiding entry point of the API based on the request message. In a possible design, the chip system further includes a memory. The memory is configured to store a program instruction and data that are necessary for the topology hiding entry point. The chip system may include a chip, or may include a chip and another discrete device.

For a technical effect brought by any design manner in the sixteenth aspect to the twentieth aspect, refer to the technical effect brought by any one of the fifth aspect or the possible designs of the foregoing aspect. Details are not described again.

According to a twenty-first aspect, an API topology hiding system is provided, and includes the CCF according to any design manner in the sixth aspect to the tenth aspect, the topology hiding request entity according to any design manner in the eleventh aspect to the fifteenth aspect, and the topology hiding entry point according to any design manner in the sixteenth aspect to the twentieth aspect.

These aspects or other aspects in this application may be clearer and more intelligible in descriptions in the following embodiments.

BRIEF DESCRIPTION OF DRAWINGS

FIG. 5A and FIG. 5B are a flowchart of still another API topology hiding method according to an embodiment of this application;

DESCRIPTION OF EMBODIMENTS

The following describes implementations in embodiments of this application in detail with reference to the accompanying drawings.

Figure 1:
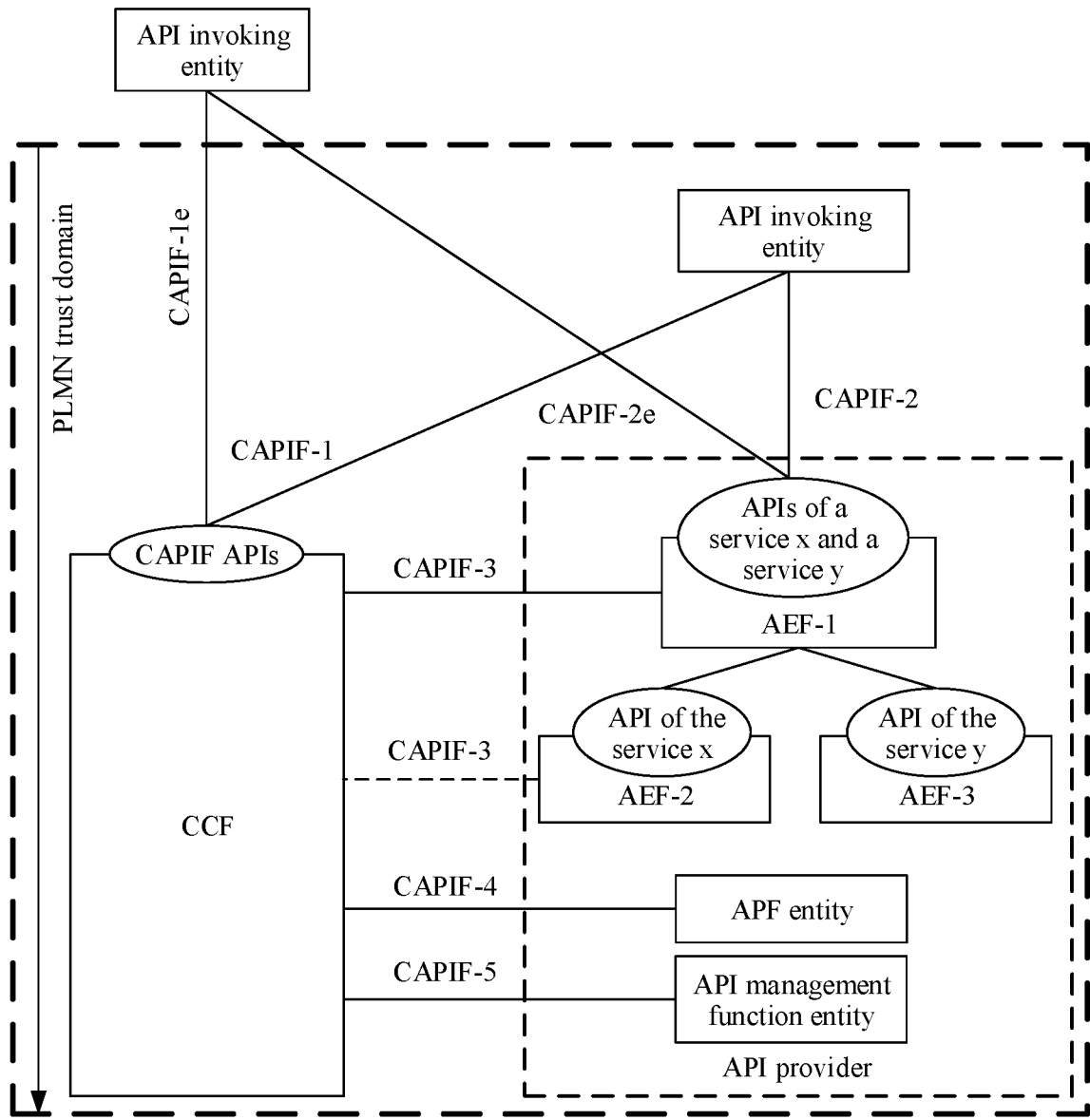
FIG. 1 is a schematic diagram of a CAPIF according to an embodiment of this application.

An API topology hiding method provided in the embodiments of this application may be used to hide an AEF that provides an API of a service in a CAPIF shown in FIG. 1. As shown in FIG. 1, the CAPIF may include an API invoking entity (which may also be referred to as an API invoker), a CCF, an AEF, an API publish function (APF), and an API management function entity. The AEF, the APF, and the API management function entity belong to an API provider domain, and different function entities may be connected by using a CAPIF-x interface. For example, the API invoking entity may be connected to the CCF by using a CAPIF-1 interface. In the CAPIF shown in FIG. 1, the API invoking entity and another function entity in the CAPIF may be located in a same public land mobile network (PLMN) trusted domain (Trust Domain), or the API invoking entity and another function entity in the CAPIF may be located in different PLMNs. Different AEFs may be connected in a cascading manner, or may be connected in another manner. When an AEF is cascaded to another AEF, the AEF may be connected to the CCF by using a CAPIF-4 interface, or may not be connected to the CCF. It should be noted that FIG. 1 is merely an example framework diagram. In addition to the function entities shown in FIG. 1, the CAPIF may further include another function entity. This is not limited.

Usually, the CAPIF shown in FIG. 1 may be deployed in a 4th generation (4G) or 5th generation (5G) mobile communications system.

When the CAPIF is deployed in the 4G mobile communications system, the API invoking entity in FIG. 1 may be an application function (AF), a third-party application (for example, a machine to machine (M2M) application, an internet of things (IoT) application, or a vehicle-to-everything (V2X) application), a mobility management entity (MME), a radio access network (RAN), a policy and charging rules function (PCRF) unit, a home subscriber server (HSS), a serving call session control function (S-CSCF), or the like. It should be noted that, the AEF in FIG. 1 may be deployed in a service capability exposure function (SCEF), and the CCF may be independently deployed in a network entity in the 4G mobile communications system, or the CCF, the AEF, the APF, and the API management function entity are deployed together in an SCEF in a centralized manner.

When the CAPIF is deployed in the 5G mobile communications system, the API invoking entity in FIG. 1 may be a third-party application, an access and mobility management function (AMF), a session management function (SMF), a user plane function (UPF), a policy control function (PCF), an AF, or the like. It should be noted that the CCF, the AEF, the APF, and the API management function entity in FIG. 1 may be independently deployed in the CAPIF, or may be deployed, in a same physical device, together with another core network element in the mobile communications system. For example, the CCF may be independently deployed in a network entity in the 5G mobile communications system, or may be deployed, in an NEF, together with a function entity in the API provider domain. This is not limited.

With reference to FIG. 1, network elements in FIG. 1 are described as follows:

The API invoking entity has a function such as supporting mutual authentication with the CCF, discovering an API, or invoking an API.

The CCF has a function such as performing authentication on the API invoking entity based on an identifier of the API invoking entity and other information, providing authorization, publication, storage, and API discovery support for the API invoking entity before the API invoking entity accesses an API, being responsible for API access control according to a policy of a PLMN operator, or detecting an API invocation.

The AEF serves as an entry for invoking an API by the API invoking entity, and may provide the API, perform authentication on the API invoking entity based on the identifier of the API invoking entity and other information provided by the CCF, confirm authorization provided by the CCF, synchronize an API log to the CCF, and so on.

The APF is configured to publish an API and so on.

The API management function entity is configured to manage an API, for example, audit an API invoking log provided by the CCF, monitor an event reported by the CCF, configure a policy of an API provider for the API, detect a status of the API, and register the API invoking entity.

Figure 2:
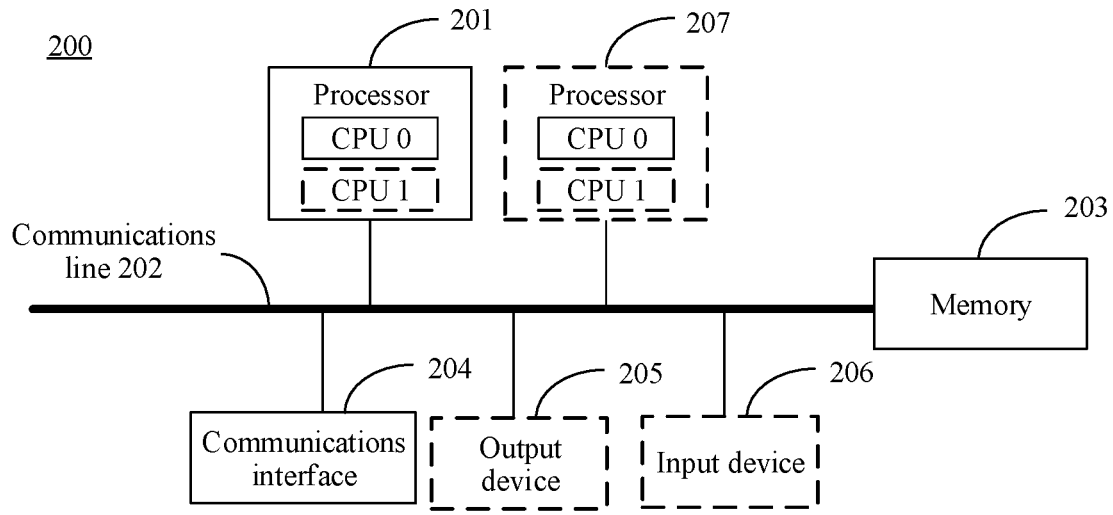
FIG. 2 is a structural diagram of a communications device according to an embodiment of this application.

To implement the technical solutions provided in the embodiments of this application, each function entity in FIG. 1 may include components shown in FIG. 2. FIG. 2 is a structural diagram of a communications device 200 according to an embodiment of this application. The communications device 200 includes at least one processor 201, a communications line 202, a memory 203, and at least one communications interface 204. The processor 201, the memory 203, and the communications interface 204 may be connected to each other by using the communications line 202.

The processor 201 may be a central processing unit (CPU), an application-specific integrated circuit (ASIC), or one or more integrated circuits configured to implement the embodiments of this application, for example, one or more microprocessors (DSP) or one or more field programmable gate arrays (FPGA).

The communications line 202 may include a path, used to transmit information between the foregoing components.

The communications interface 204 is configured to communicate with another device or a communications network, and may use any transceiver-type apparatus, such as the Ethernet, a radio access network (RAN), or a wireless local area network (WLAN).

The memory 203 may be a read-only memory (ROM) or another type of static storage device that can store static information and a static instruction, a random access memory (RAM) or another type of dynamic storage device that can store information and an instruction, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, this is not limited thereto. The memory 203 may exist independently, and be connected to the processor 201 by using the communications line 202. Alternatively, the memory 203 may be integrated into the processor 201. The memory 203 is configured to store an executable instruction or application program code, and the processor 201 controls execution, to implement an API topology hiding method provided in the following embodiments of this application.

In a possible design, a processor in an APF or an API management function entity sends, to a CCF by using a communications interface of the APF or the API management function entity, a request message that includes information about an API, to request the CCF to hide an AEF that provides the API. A communications interface of the CCF receives the request message, and a processor of the CCF determines a topology hiding entry point of the API based on the request message. When receiving an API discovery request from an API invoking entity, the communications interface of the CCF sends, to the API invoking entity, information about a topology hiding entry point of an API that meets a discovery condition, so that the API invoking entity sends, to a topology hiding entry point, an API invoking request that carries an identifier of an API requested to be invoked. After receiving the API invoking request from the API invoking entity, the topology hiding entry point finds an AEF that provides the API requested to be invoked, and sends the API invoking request to the AEF. In this way, an API on a specific AEF is indirectly invoked by using a topology hiding entry point, so that API topology hiding is implemented. Specifically, for this possible implementation, refer to FIG. 3 to FIG. 5A and FIG. 5B.

In a possible implementation, the processor 201 may include one or more CPUs, for example, a CPU 0 and a CPU 1 in FIG. 2. In another possible implementation, the communications device 200 may include a plurality of processors, for example, the processor 201 and a processor 207 in FIG. 2. In still another possible implementation, the communications device 200 may further include an output device 205 and an input device 206.

It should be noted that the communications device 200 may be a general-purpose device or a dedicated device. For example, the communications device 200 may be a desktop computer, a portable computer, a network server, a PDA, a mobile phone, a tablet computer, a wireless terminal, an embedded device, or a device having a structure similar to that in FIG. 2. A type of the communications device 200 is not limited in the embodiments of this application.

The API topology hiding method provided in the embodiments of this application may be applied to the system shown in FIG. 1. The following provides a description with reference to the system shown in FIG. 1.

Figure 3:
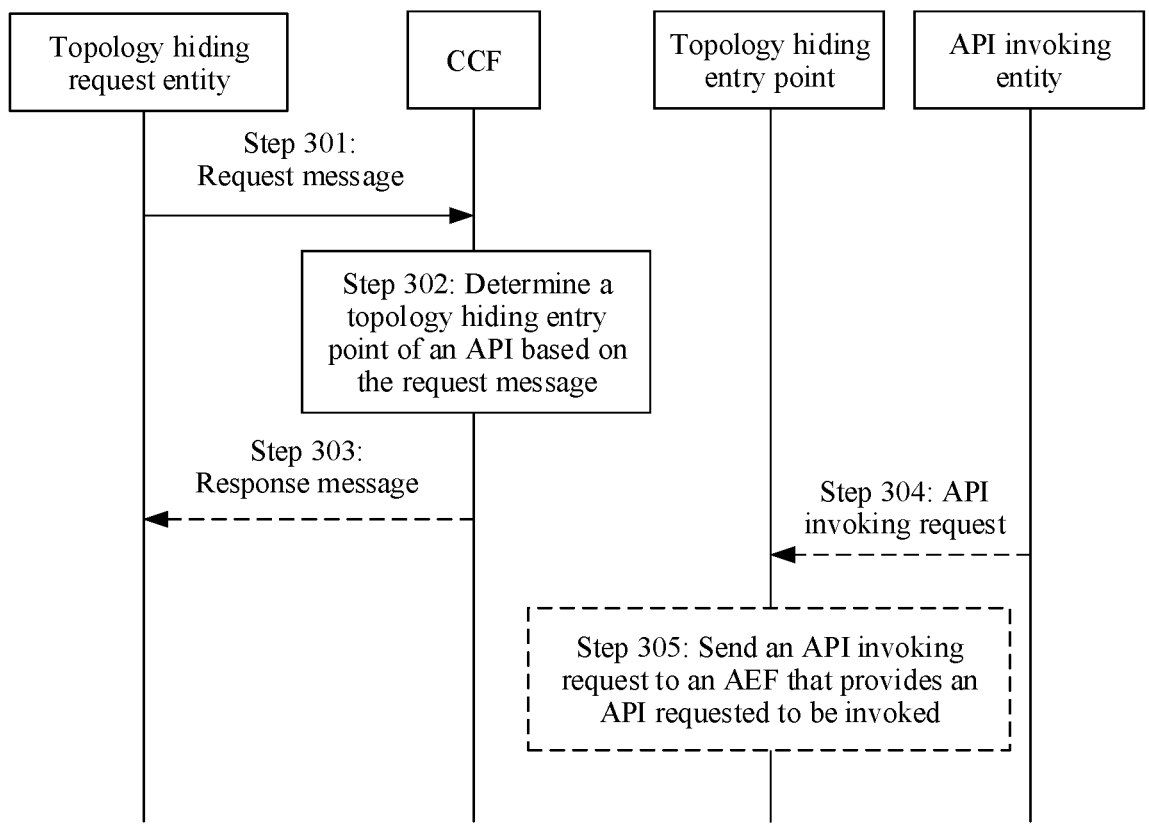
FIG. 3 is a flowchart of an API topology hiding method according to an embodiment of this application.

FIG. 3 is a flowchart of an API topology hiding method according to an embodiment of this application. The method may include the following steps.

Step 301: A topology hiding request entity sends a request message to a CCF.

The topology hiding request entity may be the APF or the API management function entity in FIG. 1. The CCF may be the CCF in FIG. 1.

The request message may be used to request the CCF to hide an AEF that provides an API, and the request message may include information about the API. It should be noted that there may be one or more APIs. This is not limited.

The request message may be used to instruct, in an explicit manner, the CCF to hide the AEF that provides the API. For example, the request message includes a topology hiding instruction used to instruct the CCF to hide the AEF that provides the API, to explicitly instruct the CCF to hide the AEF that provides the API.

Alternatively, the request message may be used to instruct, in an implicit manner, the CCF to hide the AEF that provides the API. For example, the request message includes information about a topology hiding entry point of the API, to implicitly instruct the CCF to hide the AEF that provides the API. The information about the topology hiding entry point of the API may be further used to use an AEF corresponding to the information about the topology hiding entry point as a hiding entry point of the API.

For example, the request message may be an API topology hiding request message or another type of message. For example, when the topology hiding request entity is the APF, the request message may be an API publish request, and the API publish request may be further used to request the CCF to externally publish the API.

The information about the API may be an identifier of the API, or the information about the API may be an identifier of the API and an identifier of the AEF that provides the API. The identifier of the API may be used to identify the API, and for example, may be a number (for example, a free combination of a letter, a digit, a special symbol, and the like) of the API, or may be a name of the API, an index of the API, or a uniform resource locator (URL) of the API.

The AEF that provides the API may be an AEF on which the API is deployed. Alternatively, it may be understood that the AEF has the API. In other words, the API is logically implemented by the AEF.

The identifier of the AEF that provides the API may be used to identify the AEF that provides the API, and for example, may be an internet protocol (IP) address, a URL, a device identifier, a tunnel identifier, or a fully qualified domain name (FQDN) of the AEF that provides the API.

Step 302: The CCF receives the request message from the topology hiding request entity, and determines a topology hiding entry point of the API based on the request message.

The topology hiding entry point may be used by an API invoking entity to invoke the API. For example, the API invoking entity may invoke, by using the topology hiding entry point, the API that is not provided by the topology hiding entry point. To be specific, information that is about the topology hiding entry point and that is presented to the API invoking entity is not information about a device that provides the API. The topology hiding entry point may be an AEF, and is usually an AEF different from the AEF that provides the API.

In a possible design, the request message received by the CCF further includes information about the topology hiding entry point, and the CCF determines the topology hiding entry point of the API based on the information about the topology hiding entry point. In this way, the CCF may use, as the topology hiding entry point of the API, an AEF identified by the information about the topology hiding entry point. Further, in this possible design, the request message may further include a topology hiding instruction used to instruct the CCF to hide the AEF that provides the API, or may not include the topology hiding instruction. This is not limited. For example, the request message includes the information about the API and an information element that is specially used to carry the information about the hiding entry point. Once the CCF receives the request message that includes the information element, it means that the CCF is requested to hide the AEF that provides the API. In this way, the CCF is instructed, in an implicit manner, to hide the AEF that provides the API.

The information about the topology hiding entry point may be used to identify the topology hiding entry point of the API, and may be an identifier or an address of the topology hiding entry point of the API, a number of the topology hiding entry point in a CAPIF, or the like. This is not limited.

For example, the topology hiding request entity (for example, the APF or the API management function entity) may randomly select an AEF, select an AEF with lowest load, or select an AEF closest to the AEF that provides the API from a plurality of AEFs (excluding the AEF that provides the API) as the topology hiding entry point, add the information about the topology hiding entry point to the request message, and send the request message to the CCF.

In another possible design, after the CCF receives the request message, the CCF is triggered to select the topology hiding entry point. The topology hiding entry point may be an AEF other than the AEF that provides the API. For example, the CCF may randomly select an AEF, select an AEF with lowest load, or select an AEF closest to the AEF that provides the API from a plurality of AEFs (excluding the AEF that provides the API) as the topology hiding entry point.

Further, the CCF may further send information about the topology hiding entry point to the topology hiding request entity (for example, the APF or the API management function entity), so that the topology hiding request entity sends, to the topology hiding entry point based on the information about the topology hiding entry point, the identifier of the API and the identifier of the AEF that provides the API, or performs another action.

According to the foregoing method, when the API invoking entity requests the CCF for discovering an API, the CCF may send, to the API invoking entity based on the determined topology hiding entry point used by the API invoking entity to invoke the API, information about an API that meets a discovery condition and information about a topology hiding entry point corresponding to the API, instead of sending, to the API invoking entity, information about an AEF that provides the API. In this way, the AEF that provides the API is hidden, to implement API topology hiding.

Optionally, after step 302, the method further includes:

receiving, by the CCF from the API invoking entity, an API discovery request that carries a discovery condition, where the API discovery request is used to request an API that meets the discovery condition; and obtaining, by the CCF based on the API discovery request, the API that meets the discovery condition, obtaining, based on a correspondence between an API and a topology hiding entry point, a topology hiding entry point corresponding to the API that meets the discovery condition, and sending an API discovery response to the API invoking entity, where the API discovery response may include an identifier of the API that meets the discovery condition and an identifier of the topology hiding entry point corresponding to the API that meets the discovery condition.

In this way, in an API discovery phase, the API invoking entity can obtain, from the CCF, information about the API that meets the discovery condition and information about the topology hiding entry point corresponding to the API, so that in a subsequent API invoking phase, the API invoking entity can send an API invoking request to the topology hiding entry point based on the information about the topology hiding entry point, and invoke, by using the topology hiding entry point, the API provided by another AEF. Correspondingly, the topology hiding entry point may perform the following step 304 and step 305, to implement API invocation.

The discovery condition may include one or more of the following information: a keyword in a name of the API, a type of the API, a communication type of the API, a description of the API, information (such as an IP address of the AEF, a port number of the AEF, or a URL of the AEF) about the AEF that provides the API, a data type of the API, and the like. The keyword in the name of the API may be a word or a phrase that is in the name of the API and that can be used to represent the API. For example, if QoS_Provisioning is the name of the API, both QoS_Provisioning and QoS can be used as keywords in the name of the API. The type of the API may be an operation type for a resource, and may include an operation type such as GET, POST, PUT, PATCH, or DELETE. The communication type of the API may be a communication mode supported by the API, and the communication type of the API may include an instant feedback type, a subscription type, or the like. The description of the API may be a description of an API use method. The data type of the API may represent a specific type of data supported by the API, and may include an integer type, a floating-point type, a character string type, or the like.

The obtaining, by the CCF based on the discovery request, the API that meets the discovery condition may include: matching, by the CCF, stored information about an API with the discovery condition, and using an API that matches the discovery condition as the API that meets the discovery condition. The information about the API may also include one or more of the following information: a keyword in a name of the API, a type of the API, a communication type of the API, a descriptor (such as a use method) of the API, information (such as an IP address, a port number, or a URL) about an AEF that provides the API, a data type, and the like.

In addition, the correspondence between an API and a topology hiding entry point may be stored in the CCF in a list form. After the CCF obtains the API that meets the discovery condition, the CCF may search, in a table-search manner, for the topology hiding entry point corresponding to the API that meets the discovery condition.

As shown in Table 1, if an AEF that provides an API of a service x is an AEF-2, an AEF that provides an API of a service y is an AEF-3, and topology hiding entry points of both the API of the service x and the API of the service y are an AEF-1, the CCF may store a correspondence between the topology hiding entry point and the APIs in a manner shown in Table 1. Information stored in an "API" column in Table 1 may be an API identifier, and information stored in a "topology hiding entry point" column may be an identifier of the topology hiding entry point. This is not limited.

After the CCF receives the API discovery request sent by the API invoking entity, if the CCF determines that the API of the service x is the API required by the API invoking entity, the CCF determines, by searching Table 1, that the AEF corresponding to the API of the service x is the AEF-1, and returns information about the AEF-1 to the API invoking entity.

TABLE 1

| API | Topology hiding entry point |
|---|---|
| API of a service x | AEF-1 |
| API of a service y | AEF-1 |

Optionally, in a first implementation scenario of the embodiment shown in FIG. 3, the method further includes the following step:

Step 303: The CCF sends a response message of the request message to the topology hiding request entity.

The response message is used to respond to the request message in step 301, and may be used to determine that the CCF receives the request message, or may be used to indicate or notify that topology hiding of the API is successfully set. In this way, the topology hiding request entity can learn that the CCF has successfully hidden the AEF that provides the API.

For example, the response message may be "200 OK" corresponding to the request message, or may be an API publish response, an API topology hiding response, or another type of message. This is not limited. "200 OK" corresponding to the request message may indicate that the topology hiding of the API is successfully set.

Based on the first implementation scenario of the embodiment shown in FIG. 3, the topology hiding request entity can learn that the topology hiding request entity has successfully sent the request message to the CCF. Further, when the response message is used to indicate or notify that the topology hiding of the API is successfully set, the topology hiding request entity can further learn that the CCF has successfully hidden the AEF that provides the API.

Optionally, in a second implementation scenario of the embodiment shown in FIG. 3, after the API invoking entity obtains the information about the topology hiding entry point of the API from the CCF in the foregoing API discovery process, the API invoking entity sends the API invoking request to the topology hiding entry point based on the information about the topology hiding entry point, to invoke an API on an AEF by using the topology hiding entry point. Specifically, the method further includes the following steps.

Step 304: The topology hiding entry point receives the API invoking request from the API invoking entity.

The API invoking request may be used to request to invoke an API, the API invoking request may carry an identifier of the API requested to be invoked, and the API requested to be invoked may be any API that meets the discovery condition.

Step 305: The topology hiding entry point sends an API invoking request to an AEF that provides the API requested to be invoked.

The API invoking request received by the topology hiding entry point from the API invoking entity may be the same as or different from the API invoking request sent by the topology hiding entry point to the AEF that provides the API requested to be invoked. This is not limited.

For example, that the topology hiding entry point sends an API invoking request to an AEF that provides the API requested to be invoked in step 305 may include:

sending, by the topology hiding entry point based on a correspondence between the API and the AEF that provides the API, the API invoking request to the AEF that provides the API requested to be invoked.

The correspondence between the API and the AEF that provides the API may be determined by the topology hiding entry point based on an identifier of the API and an identifier of the AEF that provides the API, or may be obtained by the topology hiding entry point from another function entity. This is not limited.

For example, the topology hiding entry point may receive the identifier of the API and the identifier of the AEF that provides the API, and store, based on the identifier of the API and the identifier of the AEF that provides the API, the correspondence between the API and the AEF that provides the API. The correspondence between the API and the AEF that provides the API may be stored in a list form. In this way, after receiving the API invoking request that is sent by the API invoking entity and that carries the identifier of the API requested to be invoked, the topology hiding entry point determines, in a table-search manner, the AEF that provides the API requested to be invoked, and forwards the API invoking request to the AEF.

For example, as shown in Table 2, if an AEF that provides an API of a service x is an AEF-2, an AEF that provides an API of a service y is an AEF-3, both the AEF-2 and the AEF-3 need to be hidden, and the CCF determines that topology hiding entry points of both the API of the service x and the API of the service y are an AEF-1, the CCF may send an identifier of the API of the service x, an identifier of the AEF-2, an identifier of the API of the service y, and an identifier of the AEF-3 to the AEF-1. After receiving these pieces of information, the AEF-1 stores, in a manner shown in Table 2, a correspondence between an API and an AEF that provides the API. After the CCF receives an API invoking request that is sent by the API invoking entity and that carries the identifier of the API of the service x, the CCF determines, by searching Table 2, that the AEF-2 provides the API of the service x, and forwards the API invoking request to the AEF-2.

TABLE 2

| API | AEF that provides an API |
| --- | --- |
| API of a service x | AEF-2 |
| API of a service y | AEF-3 |

That the topology hiding entry point receives the identifier of the API and the identifier of the AEF that provides the API may include: receiving, by the topology hiding entry point from the CCF, the identifier of the API and the identifier of the AEF that provides the API, or receiving, by the topology hiding entry point from the APF or the API management function entity, the identifier of the API and the identifier of the AEF that provides the API. For example, the identifier of the API and the identifier of the AEF that provides the API may be carried in a notification message, and the notification message may be used to instruct the topology hiding entry point to hide the AEF that provides the API. The notification message may be an API topology hiding notification message. This is not limited.

Further, after the AEF that provides the API requested to be invoked receives the API invoking request sent by the topology hiding entry point, and executes API logic, the AEF that provides the API requested to be invoked may send an execution result to the topology hiding entry point. The topology hiding entry point forwards the execution result to the API invoking entity. When being forwarded, the execution result may carry the information about the topology hiding entry point, but carry no information about the AEF that provides the API requested to be invoked, to avoid exposing the information about the AEF that actually provides the API.

Based on the second implementation scenario of the embodiment shown in FIG. 3, in the API invoking phase, the API invoking request sent by the API invoking entity is sent, by using the topology hiding entry point of the API, to the AEF that provides the API, to trigger API logic execution (for example, executing a segment of code for invoking the API). In this way, API invocation can be implemented when the information about the AEF that provides the API is hidden.

Optionally, in a third implementation scenario of the embodiment shown in FIG. 3, when the topology hiding request entity sends, to the CCF, the request message that carries the information about the topology hiding entry point of the API, the method further includes:

if the CCF detects that the topology hiding entry point is unavailable (for example, load is excessively high or system breakdown occurs), sending, by the CCF to the topology hiding request entity, a response message used to indicate that the request fails or the request is rejected.

The response message may carry a cause value indicating that the request fails or is rejected, and the cause value may include that the load of the topology hiding entry point is excessively high, the system breakdown occurs, or the like. This is not limited.

In addition, the response message may further carry information about one or more available topology hiding entry points that is provided by the CCF, so that the topology hiding request entity selects a topology hiding entry point (for example, selects a topology hiding entry point with lowest load) based on the information about the one or more topology hiding entry points that is carried in the response message, and sends, to the CCF, a request message carrying information about the selected topology hiding entry point. This avoids a case in which the topology hiding entry point of the API cannot be determined because the topology hiding entry point indicated by the topology hiding request entity is unavailable, so as to ensure normal invocation of the API.

Optionally, in a fourth implementation scenario of the embodiment shown in FIG. 3, when the topology hiding request entity sends, to the CCF, the request message that carries the information about the topology hiding entry point of the API, the method further includes:

selecting, by the CCF as a topology hiding entry point of the API, another AEF other than the topology hiding entry point requested by the topology hiding request entity, and sending, to the topology hiding request entity, a response message carrying information about the topology hiding entry point that is of the API and that is selected by the CCF.

Further, the topology hiding request entity receives the information about topology hiding entry point that is of the API and that is selected by the CCF, and stores the information about the topology hiding entry point.

The response message corresponds to the request message, and may be used to indicate that the CCF successfully receives the request message sent by the topology hiding request entity, but selects the new topology hiding entry point instead of accepting the topology hiding entry point specified by the topology hiding request entity.

Based on the fourth implementation scenario of the embodiment shown in FIG. 3, the CCF may not accept the topology hiding entry point specified by the topology hiding request entity, but actively specify the topology hiding entry point, so that the CCF has absolute master control right in topology hiding entry point selection.

Figure 4:
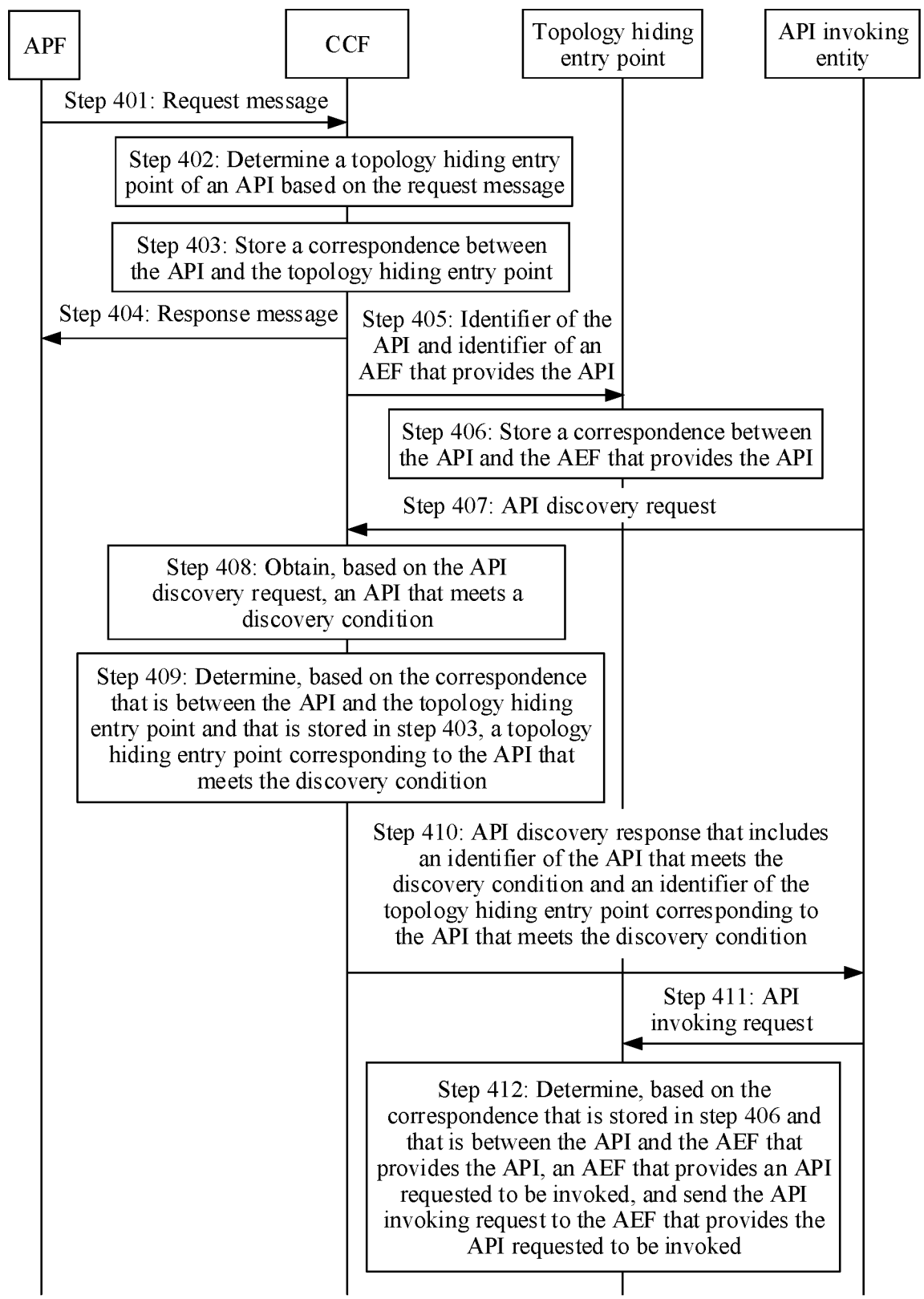
FIG. 4 is a flowchart of another API topology hiding method according to an embodiment of this application.

With reference to an embodiment shown in FIG. 4, the following describes the solution in FIG. 3 by using an example in which the topology hiding request entity is the APF. It should be noted that, when the topology hiding request entity is the API management function entity, for an execution process of the API management function entity, refer to a solution shown in FIG. 4. For example, the APF in the embodiment shown in FIG. 4 may be replaced with the API management function entity.

FIG. 4 is a flowchart of another API topology hiding method according to an embodiment of this application. The method includes the following steps.

Step 401: An APF sends a request message to a CCF.

The APF may be the APF in FIG. 1, and the request message may be an API publish request.

Specifically, for a related description of the request message and an execution process of step 401, refer to the description in step 301. Details are not described again.

Step 402: The CCF receives the request message from the APF, and determines a topology hiding entry point of an API based on the request message.

For step 402, refer to the description in step 302. Details are not described again.

Step 403: The CCF stores a correspondence between the API and the topology hiding entry point.

For step 403, refer to the description in FIG. 3. Details are not described again.

Step 404: The CCF sends a response message to the APF.

The response message is used to indicate that topology hiding of the API is successfully set.

Step 405: The CCF sends a notification message to the topology hiding entry point, where the notification message includes an identifier of the API and an identifier of an AEF that provides the API, and the notification message is used to instruct the topology hiding entry point to hide the AEF that provides the API.

It should be noted that step 404 and step 405 may be performed in a sequence shown in FIG. 4, or step 405 may be performed before step 404. This is not limited.

Step 406: The topology hiding entry point receives the notification message from the CCF, and stores, based on the identifier of the API and the identifier of the AEF that provides the API, a correspondence between the API and the AEF that provides the API.

Step 407: The CCF receives an API discovery request from an API invoking entity.

The API discovery request is used to request an API that meets a discovery condition, and the API discovery request may include the discovery condition.

Step 408: The CCF obtains, based on the API discovery request, the API that meets the discovery condition.

Step 409: The CCF obtains, based on the correspondence that is between the API and the topology hiding entry point and that is stored in step 403, a topology hiding entry point corresponding to the API that meets the discovery condition.

Step 410: The CCF sends, to the API invoking entity, an API discovery response that includes an identifier of the API that meets the discovery condition and an identifier of the topology hiding entry point corresponding to the API that meets the discovery condition.

Step 411: The topology hiding entry point receives an API invoking request from the API invoking entity.

For step 411, refer to the description in step 304. Details are not described again.

Step 412: The topology hiding entry point determines, based on the correspondence that is stored in step 406 and that is between the API and the AEF that provides the API, an AEF that provides an API requested to be invoked, and sends the API invoking request to the AEF that provides the API requested to be invoked.

For step 412, refer to step 305. Details are not described again.

It should be noted that, step 405 in the embodiment shown in FIG. 4 may be replaced with the following: The APF sends a notification message to the topology hiding entry point.

In addition, in the embodiments shown in FIG. 3 and FIG. 4, the request message sent by the topology hiding request entity to the CCF may be used to request to hide information about one API, or may be used to request to hide information about a plurality of APIs, that is, to hide AEFs corresponding to the plurality of APIs, so as to implement topology hiding of one or more APIs.

According to the method shown in FIG. 4, the APF may request the CCF to hide the AEF that provides the API, and the CCF determines the topology hiding entry point of the API. When the API invoking entity requests the CCF for discovering the API, the CCF sends, to the API invoking entity, information about the API that meets the discovery condition and information about the topology hiding entry point corresponding to the API, instead of sending, to the API invoking entity, information about the AEF that provides the API, so as to hide the AEF that provides the API. Further, in an API invoking phase, the API invoking entity may send the API invoking request to the topology hiding entry point of the API, to send, by using the topology hiding entry point, the API invoking request to the AEF that provides the API. During entire processing, the information about the AEF that provides the API is hidden from the API invoking entity, so that the information about the AEF that provides the API is not known by the API invoking entity. Therefore, system security of a CAPIF is improved.

Figure 5A:
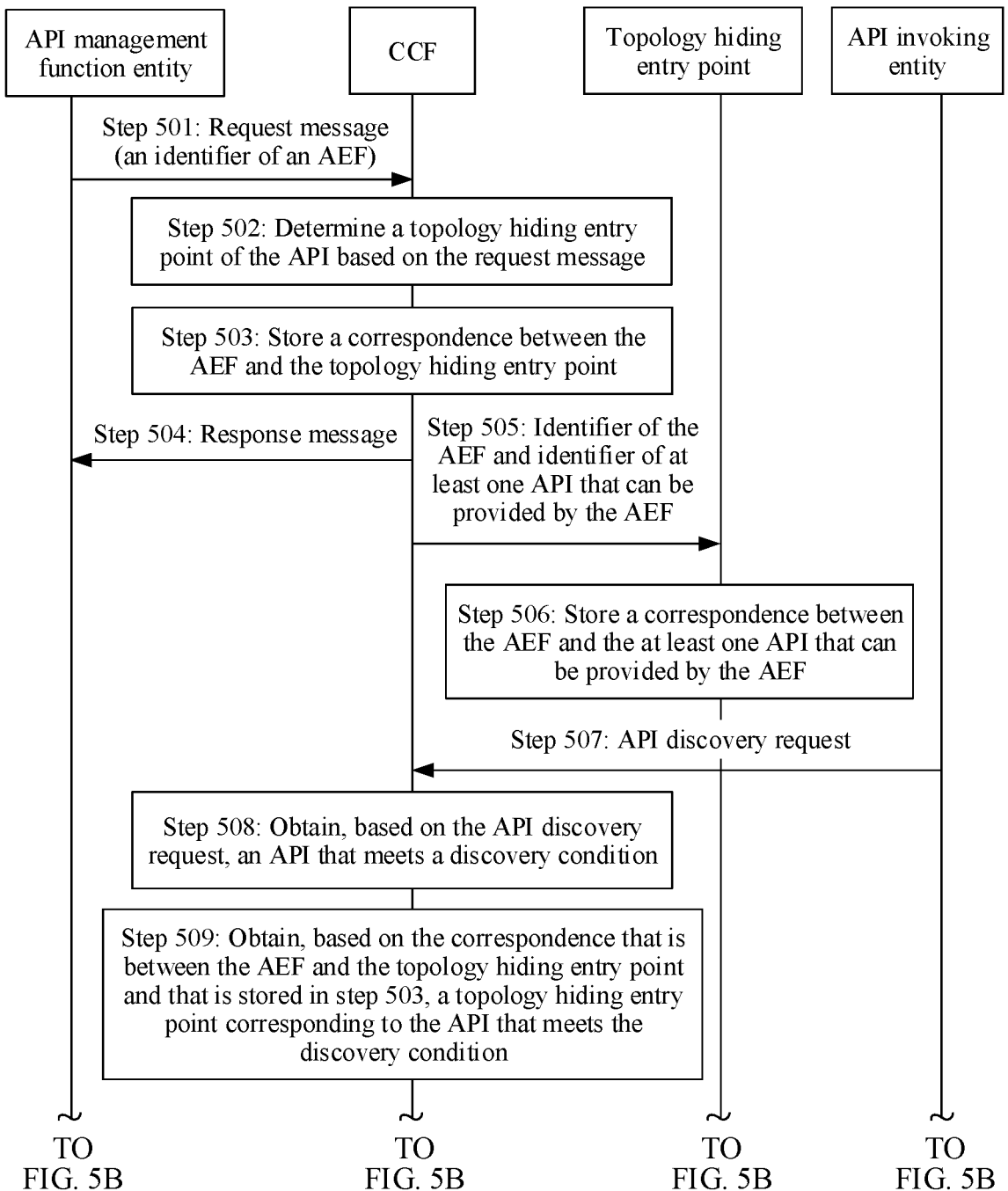

FIG. 5A and FIG. 5B show still another API topology hiding method according to an embodiment of this application. In this embodiment, an example in which a topology hiding request entity is an API management function entity is used for description. As shown in FIG. 5A and FIG. 5B, the method includes the following steps.

Step 501: The API management function entity sends a request message to a CCF.

The API management function entity may be the API management function entity in FIG. 1.

The request message may include an identifier of an AEF, and the request message is used to request to perform topology hiding on the AEF. The AEF may provide one or more APIs. In other words, it may be alternatively understood that the request message is used to perform topology hiding on all APIs provided by the AEF. The request message may be an API topology hiding request.

Step 502: The CCF receives the request message from the API management function entity, and determines a topology hiding entry point of the AEF based on the request message.

For step 502, refer to the description in step 302. Details are not described again.

Step 503: The CCF stores a correspondence between the AEF and the topology hiding entry point.

Specifically, that the CCF stores a correspondence between the AEF and the topology hiding entry point may include:

The CCF stores the correspondence between the AEF and the topology hiding entry point, and the CCF may further store, in an API publish phase, the AEF and at least one API corresponding to the AEF. Alternatively, the CCF may store, in an API publish phase, at least one API that can be provided by the AEF, and store, based on the at least one API provided by the AEF, a correspondence between the at least one API and the topology hiding entry point.

Step 504: The CCF sends a response message to the API management function entity.

The response message is used to indicate that topology hiding of the API is successfully set. The response message may be an API topology hiding response. Optionally, the response message may further include information about the topology hiding entry point.

Step 505: The CCF sends a notification message to the topology hiding entry point, where the notification message includes an identifier of the AEF and an identifier of the at least one API that can be provided by the AEF, and the notification message is used to instruct the topology hiding entry point to hide the AEF that provides the API.

It should be noted that step 504 and step 505 may be performed in a sequence shown in FIG. 5A and FIG. 5B, or step 505 may be performed before step 504. This is not limited.

Step 506: The topology hiding entry point receives, from the CCF, the identifier of the AEF and the identifier of the at least one API that can be provided by the AEF, and stores a correspondence between the AEF and the at least one API that can be provided by the AEF.

Step 507: The CCF receives an API discovery request from an API invoking entity.

The API discovery request is used to request an API that meets a discovery condition, and the API discovery request may include the discovery condition.

Step 508: The CCF obtains, based on the API discovery request, an API that meets the discovery condition.

Step 509: The CCF obtains, based on the correspondence that is between the AEF and the topology hiding entry point and that is stored in step 503, a topology hiding entry point corresponding to the API that meets the discovery condition.

Step 510: The CCF sends, to the API invoking entity, an API discovery response that includes an identifier of the API that meets the discovery condition and an identifier of the topology hiding entry point corresponding to the API that meets the discovery condition.

For step 507 to step 510, refer to the API discovery process described in FIG. 3. Details are not described again.

Step 511: The topology hiding entry point receives, from the API invoking entity, an API invoking request that carries an identifier of an API requested to be invoked.

For step 511, refer to step 304. Details are not described again.

Step 512: The topology hiding entry point determines, based on the correspondence that is stored in step 506 and that is between the AEF and the at least one API that can be provided by the AEF, an AEF that provides the API requested to be invoked, and sends the API invoking request to the AEF that provides the API requested to be invoked.

For step 512, refer to step 305. Details are not described again.

It should be noted that, step 505 in the embodiment shown in FIG. 5A and FIG. 5B may be replaced with the following: The API management function entity sends the notification message to the topology hiding entry point.

According to the method shown in FIG. 5A and FIG. 5B, the API management function entity may request the CCF to hide an AEF (in other words, hide the AEF that provides the one or more APIs), and the CCF determines the topology hiding entry point of the AEF, to implement topology hiding of the one or more APIs. When the API invoking entity requests the CCF for discovering the API, the CCF sends, to the API invoking entity, information about the API that meets the discovery condition and information about the topology hiding entry point corresponding to the API, instead of sending, to the API invoking entity, information about the AEF that provides the API, so as to hide the AEF that provides the API. Further, in an API invoking phase, when invoking one or more APIs on the AEF, the API invoking entity may send the API invoking request to the topology hiding entry point of the AEF, to send, by using the topology hiding entry point, the API invoking request to the AEF that provides the API, so as to invoke the one or more APIs. In addition, during entire processing, the information about the AEF is hidden from the API invoking entity, so that the information about the AEF is not known by the API invoking entity. Therefore, security on the AEF is ensured, and system security of a CAPIF is improved.

The method provided in the embodiments of this application is mainly described above from a perspective of interaction between nodes. It may be understood that, to implement the foregoing functions, each node such as a communications device, for example, a CCF, a topology hiding request entity, or a topology hiding entry point includes a corresponding hardware structure and/or software module for performing each function. A person skilled in the art should easily be aware that in combination with the examples described in the embodiments disclosed in this specification, algorithm steps in this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function module division may be performed on the CCF, the topology hiding request entity, and the topology hiding entry point according to the method examples. For example, various function modules may be obtained through division according to the corresponding functions, or two or more functions may be integrated into one processing module. The integrated module may be implemented in a form of hardware, or may be implemented in a form of a software function module. It should be noted that the module division in the embodiments of this application is an example, and is merely logical function division. There may be another division manner in actual implementation.

Figure 6:
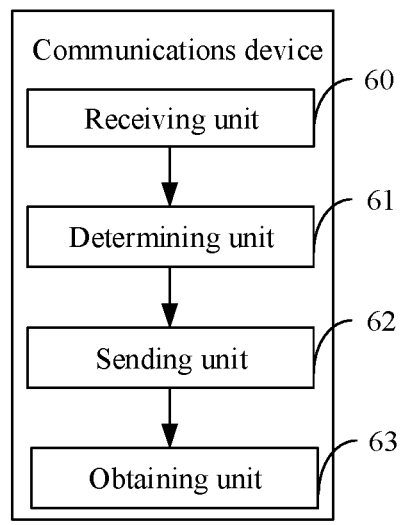
FIG. 6 is a structural diagram of a CCF according to an embodiment of this application.

FIG. 6 is a structural diagram of a communications device. The communications device may be a CCF, a chip in a CCF, or a system on chip. The communications device may be configured to perform a function of the CCF in the foregoing embodiments.

In a possible implementation, the communications device shown in FIG. 6 includes a receiving unit 60 and a determining unit 61.

The receiving unit 60 is configured to receive a request message including information about an API from a topology hiding request entity. For example, the receiving unit 60 supports the communications device in performing step 301 and step 401.

The determining unit 61 is configured to determine a topology hiding entry point of the API based on the request message received by the receiving unit 60. For example, the determining unit 61 supports the communications device in performing step 302 and step 402.

Further, in this possible design, the communications device shown in FIG. 6 may further include:

a sending unit 62, configured to send information about the topology hiding entry point to the topology hiding request entity.

Further, the sending unit 62 shown in FIG. 6 is further configured to send, to the topology hiding entry point, an identifier of the API and an identifier of an AEF that provides the API. For example, the sending unit 62 supports the communications device in performing step 405.

Further, the sending unit 62 shown in FIG. 6 is further configured to send a response message to the topology hiding request entity. For example, the sending unit 62 supports the communications device in performing step 303 and step 404.

Further, the receiving unit 60 shown in FIG. 6 is further configured to receive, from an API invoking entity, an API discovery request that carries a discovery condition. For example, the receiving unit 60 supports the communications device in performing step 407. The communications device shown in FIG. 6 may further include an obtaining unit 63, configured to: obtain, based on the API discovery request received by the receiving unit 60, an API that meets the discovery condition, and obtain, based on a correspondence between an API and a topology hiding entry point, a topology hiding entry point corresponding to the API that meets the discovery condition. For example, the obtaining unit 63 supports the communications device in performing step 408 and step 409.

The sending unit 62 shown in FIG. 6 is further configured to send an API discovery response to the API invoking entity, and the API discovery response includes an identifier of the API that meets the discovery condition and an identifier of the topology hiding entry point corresponding to the API that meets the discovery condition. For example, the sending unit 62 supports the communications device in performing step 410.

It should be noted that all related content of the steps in the foregoing method embodiments can be cited in function descriptions of the corresponding function modules. Details are not described herein again. The communications device provided in this embodiment of this application is configured to perform a function of the CCF in the foregoing API topology hiding method, and therefore can achieve a same effect as the foregoing API topology hiding method.

In another possible implementation, the communications device shown in FIG. 6 may include a processing module and a communications module. The processing module is configured to control and manage an action of the communications device. For example, the processing module is configured to support the communications device in performing step 302, step 402, step 403, step 408, step 409, step 502, step 503, step 508, step 509, and/or another process in a technology described in this specification. The communications module is configured to support the communications device in communicating with another network entity, for example, communicating with a function module or a network entity shown in FIG. 1. Further, the communications device may further include a storage module, configured to store program code and data of the communications device.

The processing module may be a processor or a controller. The processing module may implement or execute various example logical blocks, modules, and circuits described with reference to content disclosed in this application. Alternatively, the processing module may be a combination for implementing a computing function, for example, a combination of one or more microprocessors or a combination of a DSP and a microprocessor. The communications module may be a transceiver circuit, a communications interface, or the like. The storage module may be a memory. When the processing module is a processor, the communications module is a communications interface, and the storage module is a memory, the communications device shown in FIG. 6 may be the communications device shown in FIG. 2.

Figure 7:
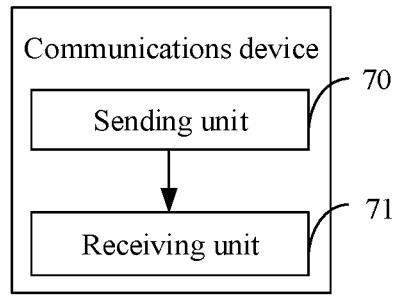
FIG. 7 is a structural diagram of a topology hiding request entity according to an embodiment of this application.

FIG. 7 is a structural diagram of a communications device. The communications device may be a topology hiding request entity, a chip in a topology hiding request entity, or a system on chip. The communications device may be configured to perform a function of the APF or the API management function entity in the foregoing embodiments.

In a possible implementation, the communications device shown in FIG. 7 includes a sending unit 70 and a receiving unit 71.

The sending unit 70 is configured to send a request message including information about an API to a CCF. For example, the sending unit 70 supports the communications device in performing step 301 and step 401.

The receiving unit 71 is configured to receive a response message of the request message from the CCF. For example, the receiving unit 71 supports the communications device in performing step 303 and step 404.

Further, the receiving unit 71 is further configured to receive, from the CCF, information about a topology hiding entry point of the API.

Further, the sending unit 70 is further configured to send, to the topology hiding entry point of the API, an identifier of the API and an identifier of an AEF that provides the API.

It should be noted that all related content of the steps in the foregoing method embodiments can be cited in function descriptions of the corresponding function modules. Details are not described herein again. The communications device provided in this embodiment of this application is configured to perform a function of the APF or the API management function entity in the foregoing API topology hiding method, and therefore can achieve a same effect as the foregoing API topology hiding method.

In another possible implementation, the communications device shown in FIG. 7 includes a processing module and a communications module. The processing module is configured to control and manage an action of the communications device. For example, the processing module is configured to support the communications device in performing another process in a technology described in this specification. The communications module is configured to support the communications device in communicating with another network entity, for example, communicating with a function module or a network entity shown in FIG. 1. The communications device may further include a storage module, configured to store program code and data of the communications device.

The processing module may be a processor or a controller. The processing module may implement or execute various example logical blocks, modules, and circuits described with reference to content disclosed in this application. Alternatively, the processing module may be a combination for implementing a computing function, for example, a combination of one or more microprocessors or a combination of a DSP and a microprocessor. The communications module may be a transceiver circuit, a communications interface, or the like. The storage module may be a memory. When the processing module is a processor, the communications module is a communications interface, and the storage module is a memory, the communications device in this embodiment of this application may be the communications device shown in FIG. 2.

Figure 8:
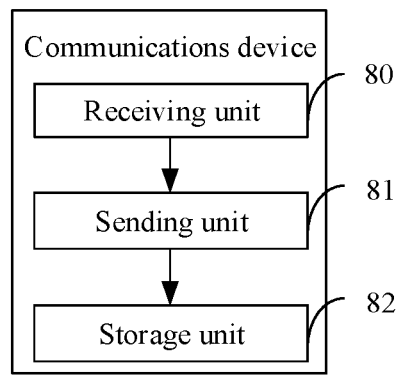
FIG. 8 is a structural diagram of a topology hiding entry point according to an embodiment of this application.

FIG. 8 is a structural diagram of a communications device. The communications device may be a topology hiding entry point, a chip in a topology hiding entry point, or a system on chip. The communications device may be configured to perform a function of the topology hiding entry point in the foregoing embodiments.

In a possible implementation, the communications device shown in FIG. 8 includes a receiving unit 80 and a sending unit 81.

The receiving unit 80 is configured to receive, from an API invoking entity, an API invoking request that carries an identifier of an API requested to be invoked. For example, the receiving unit 80 supports the communications device in performing step 411 and step 511.

The sending unit 81 is configured to send the API invoking request to an AEF that provides the API requested to be invoked. For example, the sending unit 81 supports the communications device in performing step 412 and step 512.

Further, the receiving unit 80 is further configured to receive an identifier of an API and an identifier of an AEF that provides the API, and the communications device shown in FIG. 8 further includes a storage unit 82, configured to store, based on the identifier of the API and the identifier of the AEF that provides the API that are received by the receiving unit 80, a correspondence between the API and the AEF that provides the API. For example, the receiving unit 80 supports the communications device in performing step 405, step 406, step 505, and step 506. Alternatively, the receiving unit 80 is further configured to receive a correspondence.

It should be noted that all related content of the steps in the foregoing method embodiments can be cited in function descriptions of the corresponding function modules. Details are not described herein again. The communications device provided in this embodiment of this application is configured to perform a function of the topology hiding entry point in the foregoing API topology hiding method, and therefore can achieve a same effect as the foregoing API topology hiding method.

In another possible implementation, the communications device shown in FIG. 8 includes a processing module and a communications module. The processing module is configured to control and manage an action of the communications device. For example, the processing module is configured to support the communications device in performing step 305, step 406, step 412, step 506, step 512, and/or another process in a technology described in this specification. The communications module is configured to support the communications device in communicating with another network entity, for example, communicating with a function module or a network entity shown in FIG. 1. The communications device may further include a storage module, configured to store program code and data of the communications device.

The processing module may be a processor or a controller. The processing module may implement or execute various example logical blocks, modules, and circuits described with reference to content disclosed in this application. Alternatively, the processing module may be a combination for implementing a computing function, for example, a combination of one or more microprocessors or a combination of a DSP and a microprocessor. The communications module may be a transceiver circuit, a communications interface, or the like. The storage module may be a memory. When the processing module is a processor, the communications module is a communications interface, and the storage module is a memory, the communications device in this embodiment of this application may be the communications device shown in FIG. 2.

Figure 9:
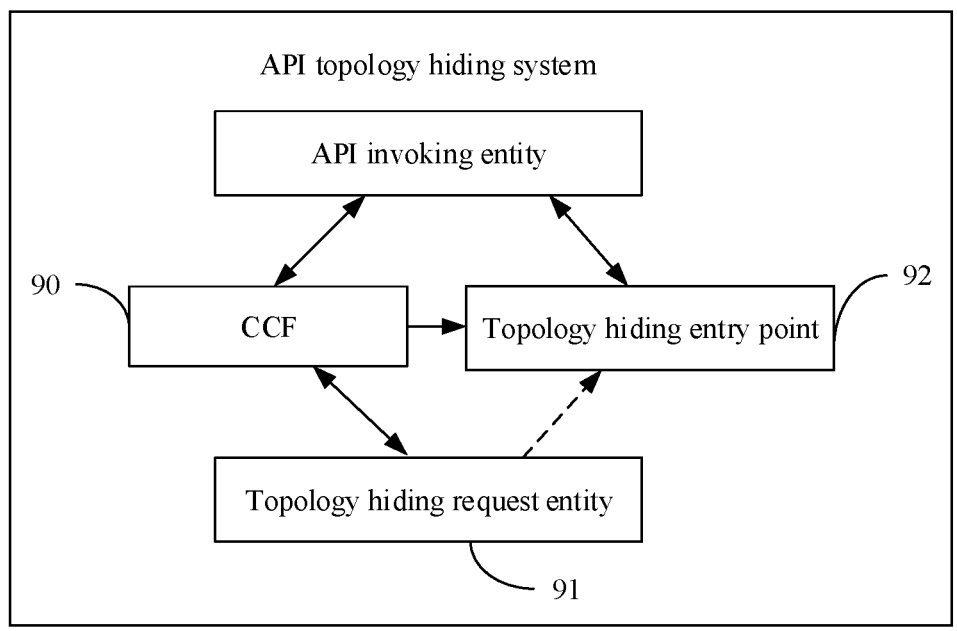
FIG. 9 is a structural diagram of an API topology hiding system according to an embodiment of this application.

FIG. 9 is a structural diagram of an API topology hiding system according to an embodiment of this application. As shown in FIG. 9, the API topology hiding system may include a CCF 90, a topology hiding request entity 91, a topology hiding entry point 92, and an API invoking entity.

The CCF 90 may be the communications device shown in FIG. 6, and is configured to perform a function of the CCF in the foregoing method embodiments. The topology hiding request entity 91 may be the communications device shown in FIG. 7, and is configured to perform a function of the APF or the API management function entity in the foregoing method embodiments. The topology hiding entry point 92 may be the communications device shown in FIG. 8, and is configured to perform a function of the topology hiding entry point in the foregoing method embodiments. Details are not described again.

It should be noted that all related content of the steps in the foregoing method embodiments can be cited in function descriptions of the corresponding function entities. Details are not described herein again. For example, the function entities in the API topology hiding system provided in this embodiment of this application may interact with each other to perform the following process: The topology hiding request entity 91 requests the CCF 90 to hide an AEF that provides an API, the CCF 90 determines a topology hiding entry point 92 of the API, and when the API invoking entity requests the CCF 90 for discovering one or more APIs, the CCF 90 sends, to the API invoking entity, information about an API that meets a discovery condition and information about a topology hiding entry point 92 corresponding to the API, instead of sending, to the API invoking entity, information about an AEF that provides the API, so as to hide the AEF that provides the API. In this way, in an API invoking phase, the API invoking entity sends an API invoking request to the topology hiding entry point 92 of the API, to send, by using the topology hiding entry point 92, the API invoking request to the AEF that provides the API. The information about the AEF that provides the API is hidden from the API invoking entity, so that the information about the AEF that provides the API is not known by the API invoking entity. Therefore, system security of a CAPIF is improved.

The foregoing descriptions about implementations allow a person skilled in the art to clearly understand that, for the purpose of convenient and brief description, division of only the foregoing function modules is used as an example for illustration. In actual application, the foregoing functions can be allocated to different function modules for implementation based on a requirement, that is, an inner structure of an apparatus is divided into different function modules to implement all or some of the functions described above.

In the several embodiments provided in this application, it should be understood that the disclosed apparatus and method may be implemented in another manner. For example, the described apparatus embodiments are merely examples. For example, the module or unit division is merely logical function division. There may be another division manner in actual implementation. For example, a plurality of units or components may be combined or may be integrated into another apparatus, or some features may be ignored or not be performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate components may or may not be physically separate, and components displayed as units may be one or more physical units, in other words, may be located in one place, or may be distributed on a plurality of different places. Some or all of the units may be selected based on actual requirements to achieve the objectives of the solutions in the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
  sending, by an application programming interface (API) invoker, an API discovery request to a common API framework core function (CCF), wherein the API discovery request carries a discovery condition;
  receiving, by the API invoker, an API discovery response from the CCF, wherein the API discovery response comprises an identifier of an API and information of a topology hiding entry point, and wherein the API meets the discovery condition; and
  sending, by the API invoker, an API invoking request to the topology hiding entry point, wherein the API invoking request carries the identifier of the API, wherein the API invoking request is sent by the topology hiding entry point to an API exposing function (AEF) that provides the API.

2. The method according to claim 1, wherein the API invoking request is sent, by the topology hiding entry point to the AEF that provides the API based on a correspondence between the API and the AEF that provides the API.

3. The method according to claim 2, wherein the method further comprises:
  sending, by the CCF to the topology hiding entry point, the identifier of the API and an identifier of the AEF that provides the API;
  receiving, by the topology hiding entry point, the identifier of the API and the identifier of the AEF that provides the API; and
  storing, by the topology hiding entry point, based on the identifier of the API and the identifier of the AEF that provides the API, the correspondence between the API and the AEF that provides the API.

4. The method according to claim 3, wherein sending, by the CCF to the topology hiding entry point, the identifier of the API and the identifier of the AEF that provides the API comprises:
  sending, by the CCF to the topology hiding entry point, an API topology hiding notification, wherein the API topology hiding notification comprises the identifier of the API and the identifier of the AEF that provides the API.

5. The method according to claim 3, wherein the method further comprises:
  sending, by an API publish function, an API publish request to the CCF, wherein the API publish request comprises information of the API; and
  determining, by the CCF based on the API publish request, the topology hiding entry point.

6. The method according to claim 5, wherein the information of the API comprises: the identifier of the API.

7. The method according to claim 5, wherein the determining, by the CCF based on the API publish request, the topology hiding entry point comprises:
  determining, by the CCF based on the API publish request, that the topology hiding entry point is a first AEF.

8. The method according to claim 2, wherein the method further comprises:
  receiving, by the topology hiding entry point, the correspondence.

9. The method according to claim 1, wherein the information of the topology hiding entry point comprises an identifier of the topology hiding entry point or an address of the topology hiding entry point.

10. A communications system, comprising:
  an application programming interface (API) invoker; and
  a topology hiding entry point, wherein:
  the API invoker is configured to:
    send an API discovery request to a common API framework core function (CCF), wherein the API discovery request carries a discovery condition;
    receive an API discovery response from the CCF, wherein the API discovery response comprises an identifier of an API and information of the topology hiding entry point, and wherein the API meets the discovery condition; and
    send an API invoking request to the topology hiding entry point, wherein the API invoking request carries the identifier of the API; and
  the topology hiding entry point is configured to send the API invoking request to an API exposing function (AEF) that provides the API.

11. The system according to claim 10, wherein the topology hiding entry point is further configured to:
  send, based on a correspondence between the API and the AEF that provides the API, the API invoking request to the AEF that provides the API.

12. The system according to claim 11, wherein the system further comprises the common API framework core function (CCF);
  the CCF is configured to send the identifier of the API and an identifier of the AEF that provides the API to the topology hiding entry point; and
  the topology hiding entry point is further configured to:
    receive the identifier of the API and the identifier of the AEF that provides the API, and store the correspondence between the API and the AEF that provides the API based on the identifier of the API and the identifier of the AEF that provides the API.

13. The system according to claim 12, wherein the system further comprises an API publish function;

the API publish function is configured to send an API publish request to the CCF, wherein the API publish request comprises information of the API; and the CCF is configured to determine the topology hiding entry point based on the API publish request.

14. The system according to claim 13, wherein the CCF is further configured to:

determine, based on the API publish request, that the topology hiding entry point is a first AEF.

15. The system according to claim 11, wherein the topology hiding entry point is further configured to receive the correspondence.

16. The system according to claim 10, wherein the information of the topology hiding entry point comprises an identifier of the topology hiding entry point or an address of the topology hiding entry point.

17. A non-transitory computer-readable storage medium storing programming instructions for execution by an application programming interface (API) invoker, wherein the programming instructions instruct:

the API invoker to:

send an API discovery request to a common API framework core function (CCF), wherein the API discovery request carries a discovery condition;

receive an API discovery response from the CCF, wherein the API discovery response comprises an identifier of an API and information of a topology hiding entry point, and wherein the API meets the discovery condition; and send an API invoking request to the topology hiding entry point, wherein the API invoking request carries the identifier of the API, wherein the API invoking request is sent by the topology hiding entry point to an API exposing function (AEF) that provides the API.

18. The non-transitory computer-readable storage medium according to claim 17, wherein the API invoking request is sent by the topology hiding entry point to the AEF that provides the API based on a correspondence between the API and the AEF that provides the API.

19. The non-transitory computer-readable storage medium according to claim 17, wherein the information of the topology hiding entry point comprises an identifier of the topology hiding entry point or an address of the topology hiding entry point.

* * * * *